United States Patent [19]
Lee

[11] Patent Number: 5,204,663
[45] Date of Patent: Apr. 20, 1993

[54] SMART CARD ACCESS CONTROL SYSTEM

[75] Inventor: Philip S. Lee, Potomac, Md.

[73] Assignee: Applied Systems Institute, Inc., Washington, D.C.

[21] Appl. No.: 778,748

[22] Filed: Oct. 18, 1991

Related U.S. Application Data

[63] Continuation of Ser. No. 525,889, May 21, 1990, abandoned.

[51] Int. Cl.[5] .............................................. H04B 1/00
[52] U.S. Cl. ........................... 340/825.34; 340/825.3; 340/825.31
[58] Field of Search .......... 340/825.31, 825.3, 825.34; 235/376, 380, 382, 382.5, 441, 451, 492

[56] References Cited

U.S. PATENT DOCUMENTS

| | | |
|---|---|---|
| 3,906,447 | 9/1975 | Crafton . |
| 4,157,534 | 6/1979 | Schachter . |
| 4,207,555 | 6/1980 | Trombly . |
| 4,213,118 | 7/1980 | Genest et al. . |
| 4,283,710 | 8/1981 | Genest et al. . |
| 4,835,373 | 5/1989 | Adams et al. ..................... 235/451 |
| 4,849,614 | 7/1989 | Watanabe et al. ............... 340/825.3 |
| 4,857,893 | 8/1989 | Carroll ........................... 340/825.54 |
| 4,870,400 | 9/1989 | Downs et al. .................. 340/825.34 |
| 4,914,732 | 4/1990 | Henderson et al. ............ 340/825.31 |
| 5,014,049 | 5/1991 | Bosley ............................ 340/825.31 |
| 5,070,234 | 12/1991 | Ishii et al. ............................ 235/441 |

OTHER PUBLICATIONS

"Security", vol. 27, No. 4, Apr. 1990, pp. 35-37, 44-48.
"Smart Card Monthly", Mar. 1990.
"Smart Card Monthly" Apr. 1990.

Primary Examiner—Donald J. Yusko
Assistant Examiner—Dervis Magistre
Attorney, Agent, or Firm—Finnegan, Henderson, Farabow, Garrett & Dunner

[57] ABSTRACT

An access control system, and a method of controlling an access to a controlled area, comprising an integrated-circuit card key having contact pads and a sufficient memory capacity to store key access information and transaction information, information in the integrated circuit integral therein at respective addresses, and an acceptor which includes a memory to store lock access information, and circuity for reading the key and lock access information, whenever the contact pads of the key is electrically engaged with the acceptor, comparing the key and lock access information, providing a control signal to the opening mechanism of an access controlled area based on a comparison, result and recording transactional information from the lock into the integrated circuit of the key at respective addresses.

74 Claims, 9 Drawing Sheets

DATA STRUCTURE

| CUSTOMER CARD | | SERVICE CARD | | SET-UP CARD | | SELF-DIAGNOSTIC CARD | | EMERGENCY CARD | |
|---|---|---|---|---|---|---|---|---|---|
| FIELD | DATA LENGTH (BYTE) | FIELD | DATA LENGTH (BYTE) | FIELD | DATA LENGTH (BYTE) | FIELD | DATA LENGTH (BYTE) | FIELD | DATA LENGTH |
| SYSTEM ID | 10 | SYSTEM ID | 10 | SYSTEM ID | 10 | SYSTEM ID | 10 | SYSTEM ID | 10 |
| CARD ISSUE DATE | 6 | CARD ISSUE DATE | 6 | CARD ISSUE DATE | 6 | CARD ISSUE DATE | 6 | CARD ISSUE DATE | 6 |
| CARD TYPE | 1 | CARD TYPE | 1 | CARD TYPE | 1 | CARD TYPE | 1 | CARD TYPE | 1 |
| SECURITY LEVEL | 1 | SECURITY LEVEL | 1 | SECURITY LEVEL | 1 | SECURITY LEVEL | 1 | SECURITY LEVEL | 1 |
| CUSTOMER NAME | 31 | EMPLOYEE ID | 11 | ROOM ID | 10 | ROOM ID | 10 | EMERGENCY KEY | 10 |
| CUSTOMER ADDRESS | 41 | PRIMARY KEY | 5 | EMERGENCY KEY | 10 | PRIMARY KEY | 5 | | |
| CUSTOMER CITY | 21 | SERVICE GROUP NO. | 5 | SECURITY KEYS | 450 | RAM TEST RESULT | 2 | | |
| CUSTOMER STATE | 2 | EMPLOYEE NAME | 31 | ACCESS KEY | 5 | ROM TEST RESULT | 2 | | |
| CUSTOMER ZIP | 9 | EMPLOYEE ADDRESS | 41 | COMPLETE | 1 | REAL TIME TEST RESULTS | 2 | | |
| CUSTOMER PHONE | 11 | EMPLOYEE CITY | 21 | | | | | | |
| PRIMARY KEY | 5 | EMPLOYEE STATE | 2 | | | | | | |
| ROOM ID | 10 | EMPLOYEE ZIP | 9 | | | | | | |
| SECONDARY KEY 1 | 5 | EMPLOYEE PHONE | 11 | | | | | | |
| SECONDARY KEY 2 | 5 | | | | | | | | |
| SECONDARY KEY 3 | 5 | | | | | | | | |
| CHECK IN DATE | 6 | | | | | | | | |
| CHECK IN TIME | 4 | | | | | | | | |
| EXPIRED DATE | 6 | | | | | | | | |
| TOTAL LENGTH | 179 | TOTAL LENGTH | 154 | TOTAL LENGTH | 494 | TOTAL LENGTH | 39 | TOTAL LENGTH | 28 |

FIG.3

SMART CARD ACCESS CONTROL SYSTEM

This application is a continuation of application Ser. No. 07/525,889, filed May 21, 1990 now abandoned.

BACKGROUND OF THE INVENTION

1. Field of the Invention

The present invention relates to an electronically operable access control system, more particularly an electronically controlled access control system utilizing an integrated circuit card or "smart card" as a key to gain access to an access controlled area such as hotel rooms.

2. Description of the Prior Art

The advantages of electronic cards to activate locks and other barrier mechanisms are well known. Instead of changing mechanical tumblers and cutting new metallic keys, lock and key can be programmed and reprogrammed using a computer and software. Moreover, they permit controlled access according to various levels of security.

For example, U.S. Pat. No. Re. 29,259 describes a coding scheme that uses a key field and an authorization field in the key. The key is made of a flat plastic card and the data is encoded on the card via punched holes. If the key field in the key and lock match, the opening mechanism is activated. If the key fields do not match, but the authorization field in the key matches the key field in the lock, the opening mechanism is activated, and the key field in the lock is replaced to match the key field in the card. This prevents a previous guest from using his or her card to enter the room once a new guest has activated the lock.

U.S. Pat. No. 4,717,816 describes an electronic lock and key system that uses a metallic card as a key which carries magnetically-coded data that, when inserted in a slot in the lock, opens the door if coded data in the lock matches either of two codes in the card, the new guest's code or that of the previous guest. Data in the lock can be changed using a portable computer.

However, prior art electronic lock and key systems require a special, single-purpose card for use with a particular lock or sets of locks. Further, the amount of information which can be provided or encoded in the key is limited because of the inherent limitation of encoding associated with punched holes or magnetic strips on the card. For example, the number of levels of security, which can be encoded in the key, is severely limited. Furthermore, prior art lock and key systems do not provide data transfer from the lock to the key. In other words, information encoded in the key can not be directly updated or erased by the lock. Therefore, to deactivate the key, for example, the key has to be brought to a separate system management system. Moreover, information, for example, of transactional or diagnostic nature which is provided from the lock cannot be written into the key directly therefrom. Though an improvement over mechanical lock-and-key units, cards that rely on punched holes or magnetic media provide only limited capabilities.

SUMMARY OF THE INVENTION

The present invention overcomes the problems and disadvantages of the prior art by providing an access control system which provides multiple, differing levels of security and ease of use. The system provides an additional capability in that transaction and diagnostic information are directly written into the key from the lock.

To achieve the objects and in accordance with the purpose of the invention, as embodied and broadly described herein, according to an embodiment of present invention, a key with a sufficient memory capacity, for example, a multi-purpose integrated-circuit card (called "smart card" hereinafter), is adapted to carry access information required for entry to an access controlled area, such as a hotel room. The access code can be readily changed as often as required by the manager of this system. Several access codes can be used to correspond to differing levels of access.

For example, in a hotel, different access codes, each corresponding to a different security level, can be provided for guests, security officers, housekeeping supervisors and maids. The smart card is also adapted to record thereon transaction information provided from the lock to facilitate easy access of such information by the system manager. The provided transaction information may contain information representing the activities associated with entry to the access controlled area such as the time of entry, frequency of entry, and identity of the user.

An access control system, according to another embodiment of the present invention, comprises a key card with a memory having a sufficient memory capacity for storing predetermined key access information and transaction information at respective addresses, an electromechanical device such as a solenoid or step-motor disposed in and adapted for activating the opening mechanism of the access controlled area in response to a control signal, and an acceptor for providing the control signal in response to the predetermined key access information from the key card to activate the activating device.

The acceptor includes a card acceptor for conductively engaging the key with the acceptor when the key is fully entered thereinto; a memory for storing lock access information and transaction information, circuitry for reading stored lock access information, and stored key access information from said key means whenever the key is conductively engaged with the acceptor; circuitry for comparing read key access information with read lock access information; circuitry for providing the control signal to said activating means based on the comparison; circuitry for providing transaction information representing the condition of said acceptor means; and circuitry for recording provided transaction information into the memory of the key at respective addresses.

An access control system, according to yet another embodiment of the invention, comprises circuitry for setting the contents of the memory of the key to specified values to incapacitate the functioning of the key whenever the read key access information is not identical to the read lock access information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate an embodiment of the invention and together with the description, serve to explain the principles of the invention.

BRIEF DESCRIPTION OF THE DRAWING

FIG. 3 is data structure of information stored in various types of the smart card of FIG. 2.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
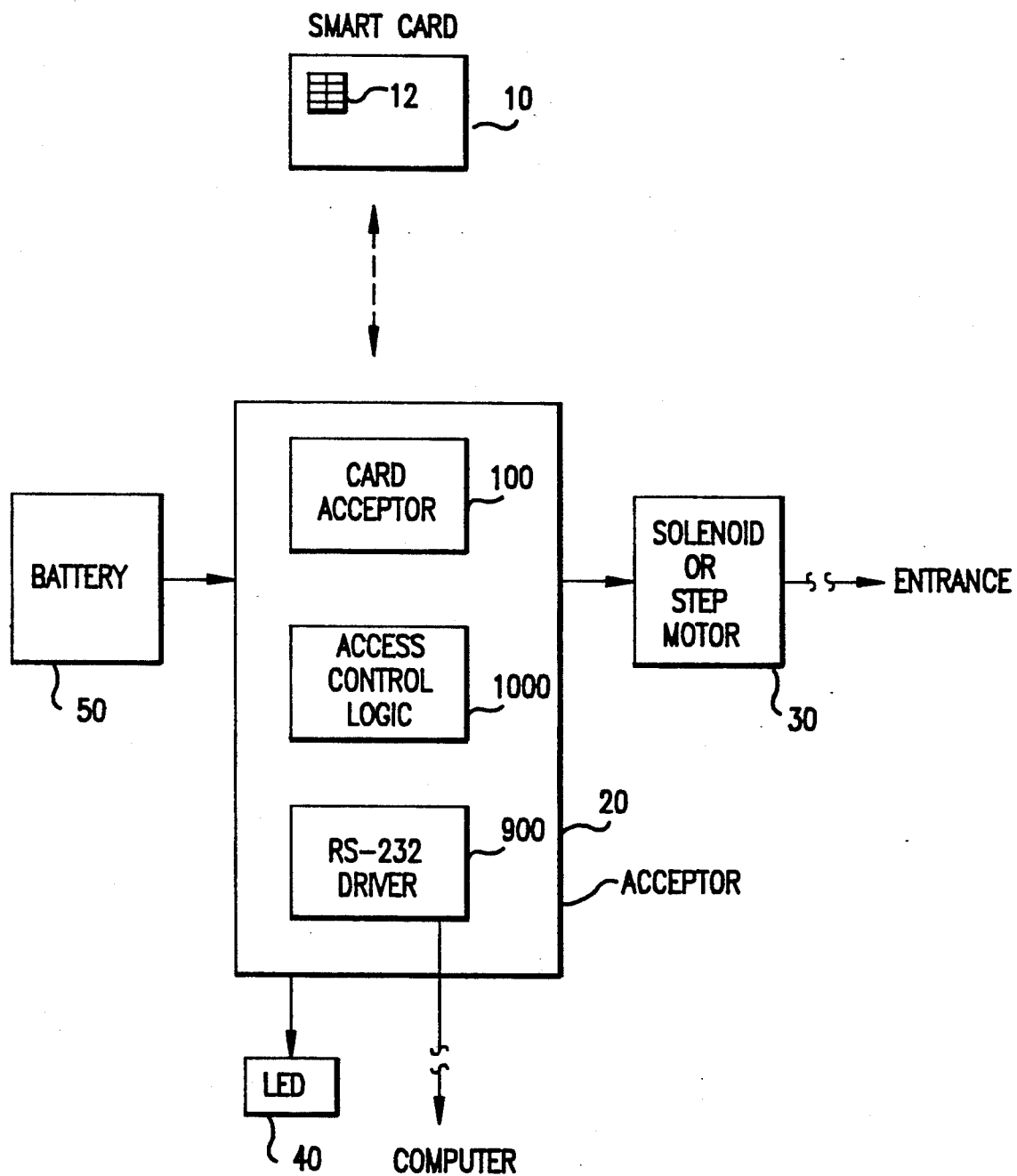
FIG. 1 is a block diagram of an access control according to an embodiment of the present invention.

Referring to FIG. 1, the access control system, according to an embodiment of the present invention, includes three elements: a smart card, an acceptor and an opening mechanism. The acceptor is coupled to and controls activating the opening mechanism of an access controlled area. Access to the access controlled area is permitted whenever the opening mechanism is activated and the card is removed from the acceptor. While each of the three elements is adaptable to the other two, each may be made and sold separately, with the customer performing needed integration.

The smart card is of three general categories: administrative, services and customer. Administrative cards are used to install the access control system and establish its initial operation. They are of three types. Installer cards are used by workmen to install the acceptor and opening mechanism of the access control system on the door and the like and verify its operation. The initial access codes for the set-up card, and the system ID, the card format, and the card type are installed into the acceptor during system installation. Set-up cards, after the system is first installed, set-up initial access codes for the customer and services and other cards in the acceptor. Access with the installer card is not possible after set-up is complete. Self-diagnostic cards exercise the hardware and software to determine if the system has been properly set up and is operating as programmed.

The services card is used to provide access to a room by an authorized person other than the customer. According to an embodiment of the present invention, 98 differing types of the services card may be programmed, each with a different access code. For example, in a hotel, emergency access codes for all access control systems (e.g., locks) may be the same whereas the security access code may be valid for one wing of the complex. An inspector and supervisor may have access codes for one or several floors, the housekeeper may have access to a specific block of rooms. The services card types possibly include emergency, security, inspector, supervisor, and housekeeper cards.

The customer cards are provided to customers who will have access to a particular access controlled area, for a specified period of time. Once a customer card has been issued to a new customer and used to gain access to the room, no previous customer card will be able to activate the system. The card may have been already issued to the customer prior to registration (e.g., through a frequent guest program) and a primary access code and three secondary access codes may be downloaded at registration. Alternatively, it can be a card that is issued exclusively to customers and is returned at the conclusion of their stay.

The services and customer cards serve as a key to gain access. Although the smart card can be used for this single purpose, the data-storage and, sometimes, microprocessor capacity of the microchip contained in the smart card provide multiple functions. For example, an employer concerned about employee access to certain areas could issue smart cards as identification media and incorporate into the data structure an access code or series of access codes that will allow an employee to pass through certain doors, gates or other barriers but not others.

A hotel chain that issues smart cards to frequent guests could use these cards to speed the collection of registration data and then assign a room with a corresponding access code to grant entry to that specific room. In other words, the guest would enter the hotel in possession of the card and would, during registration, have the appropriate electronic keys uploaded to the card by a computer.

The length of the access code is programmable and can be selected by the system manager. With a five-byte access code, the result is 7,737,809,375($95^5$) possible combinations for ASCII characters 32-126.

For a hotel, the acceptor of the system for each room would be programmed with an initial access code during set-up. The first guest to use that room will be assigned a new primary access code. In addition, the card may also include up to three secondary access codes corresponding to the primary access codes issued to the most recent, previous guests for that room. When the card is first entered into the acceptor, the acceptor reads the card to see if the card's primary access code matches the acceptor's initial access code. If it matches, the CPU activates the opening mechanism. If it does not match, the acceptor examines the card's secondary access codes. If it finds a match with any one of the secondary access codes, the acceptor rewrites the initial access code therein to match the new card's primary access code.

The primary access code will be retained in the acceptor until a new guest uses the room, at which time the primary access code in the new guest's card will replace the acceptor's existing access code. So, if a previous occupant were to attempt to enter the room, the acceptor would deny access and not activate the opening mechanism because the new access code in the acceptor would match neither the primary nor secondary access codes in the previous guest's card. Multiple guests sharing a room would have the same primary access code in their cards and thus be able to share access to the room once a member of the party has activated the card acceptor.

The acceptor manages multiple, differing levels of security. For example, guest access is one level, and ninety-eight additional security levels may be programmed into the acceptor. The possibilities for hotels include emergency, security, inspector, supervisor and housekeeper. Because the number of levels is fully programmable, it could, in fact, be expanded to 999 or 9999.

There will be a separate access code for each level of security and sufficient data storage in the cards carried by hotel staff to incorporate multiple codes. The system manager could assign unique codes to each room for maid access and thus limit individual maids to specific rooms; alternatively, a single code could be assigned to a floor or blocks of rooms on a single floor or multiple floors. Supervisors might have access to multiple floors, and the security officer might have access to every door. In short, the method of assigning codes is fully programmable by the system manager.

Because the access codes are reprogrammable, they can be readily changed in response to cards that are lost, stolen or revoked (but not returned). An issuing mechanism, such as a laptop or hand-held microcomputer, could be taken to each card acceptor or connected thereto by cable through an RS-232 serial port. Alternatively, a data carrier card can be used, as described below, to load new access codes into the acceptor.

At the option of the system manager, each card acceptor can be programmed to hold the card numbers of cards reported lost, stolen or revoked. If someone attempts to use such a card, the acceptor would write specific codes into the memory of the card and immediately deactivate functioning of the card. Only the issuing mechanism would be able to reactive it.

As alternative means of reprogramming the acceptor is the data carrier card (DCC). The DCC is a smart card that carries programmed instructions to upload data, such as a new access code, to the acceptor or to download the entry log to the DCC from an acceptor. If, for instance, a hotel maid quits and does not return her card, the housekeeping supervisor could immediately load new maid access codes in a DCC, insert the card in each acceptor and automatically change the maid access codes, thus making the absent maid's card useless. If maids also use their cards for time and attendance, new access codes could be uploaded to the maids' cards whenever their cards interact with the time and attendance reporting system.

A log of all attempts to activate the acceptor with a smart card can be downloaded to another medium using either the RS-232 serial port in the acceptor connected by cable to a portable computer or the data carrier card described above.

The smart card is itself a medium of data storage. It can be used to create a log corresponding to its use in conjunction with the acceptor. For example, when a hotel maid would use the card to enter a guest's room to clean it, that entry could be recorded in the acceptor for security purposes and in the card to document cleaning activities for record-keeping purposes. For employees who use their card to enter a secured area, entry and exit could be recorded in the card and acceptor. For extremely sensitive areas, the system could be programmed not to admit a person who has logged into the facility but has not logged out. This is commonly called "anti-passback," and its purpose is to prevent more than one person from using a card to gain admittance to a secure facility.

In addition to permitting entry according to the access code in the card, the card and acceptor can be programmed to limit access to certain periods of time. For a hotel, this could be the latest permissible checkout time, or for a secure facility, the system might limit access to certain days and shifts.

The acceptor can be battery-powered. An on-board microprocessor controls all software functions, and unique logic "burned" into the read-only memory (ROM) of the microchip prevents copying or counterfeiting. The acceptor of the embodiment of the present invention holds 32 kilobytes for programmable logic and another 32 kilobytes for data storage. The acceptor houses a real-time clock and records the time and date each time the card is inserted in the acceptor, and other data, such as name and card number, can be captured if the manager of the system so chooses.

The acceptor board and components are small enough to be retrofitted into the housing of many existing locks. The acceptor also activates red and green light emitting diodes (LEDs). The red light flashing indicates a "power-on" condition when the card is fully entered into and conductively engaged with the acceptor. The green light flashing indicates that the card is accepted and the opening mechanism is activated (the opening mechanism unlatches when the card is pulled out). The red light flashes ten times to indicate a low battery condition.

Benefits of the access control system of the present invention include:

Automated date-and-time record of guests and housekeeping staff who gain access to a particular room in the acceptor as well as in the card.

Card that is used as a customer key can also carry additional data, such as name, address and credit card accounts, in conjunction with frequent guest or frequent flyer programs.

Card can keep records of attempted entry, actual entry and exit in card as well as the card acceptor.

Capable of operating with door locks of multiple manufacturers.

Capable of incapacitating the card directly from the acceptor.

Programmable to meet (or ignore) check-in/check-out time restrictions.

Recognizes and admits multiple guests assigned to same room.

Recognizes new guest card and automatically updates internal record to prohibit entry by previous guest.

Can serve as employee identification and privilege card.

More specifically, referring to FIG. 1, the access control system, according to an embodiment of the present invention, includes a smart card 10, an acceptor 20, a solenoid (or alternatively a step motor) 30, a red/green LED 40, and a battery 50. Smart card 10, which is detachable from the rest of the system, contains an integrated circuit chip with a read/write memory whose content can be operatively updated. Solenoid 30 opens or activates the normally latchable opening mechanism of an access controlled area. After the opening mechanism is deactivated, it is automatically latched again. A step motor instead of a solenoid, can be alternatively used.

Acceptor 20 includes a card acceptor 100, an access control logic 1000 and a RS-232 driver 900. Card acceptor 100 is an electromechanical device and has an opening through which smart card 10 is entered to be conductively engaged with acceptor 20. Access control logic 1000 includes electronic components for performing required signal processing for acceptor 20. RS-232 driver 900 provides interface between acceptor 20 and a stand-alone computer (not shown) which is optionally coupled externally thereto, via a cable.

Red/green LED 40 includes a pair of red/green light emmitting diodes. The red LED, whenever activated or turned-on, flashes red light beams to indicate the "power-on" condition of the access control system and the green LED, whenever turned-on, flashes green light beams to indicate an "accepted" condition of the system, which will be described in more detail below. Battery 50 is a 12 V power supply operatively coupled to acceptor 20 and to solenoid (or step motor) 30 to provide operational power thereto and elsewhere in the system. Commercially available "AA" batteries can be used for the purpose.

Figure 2:
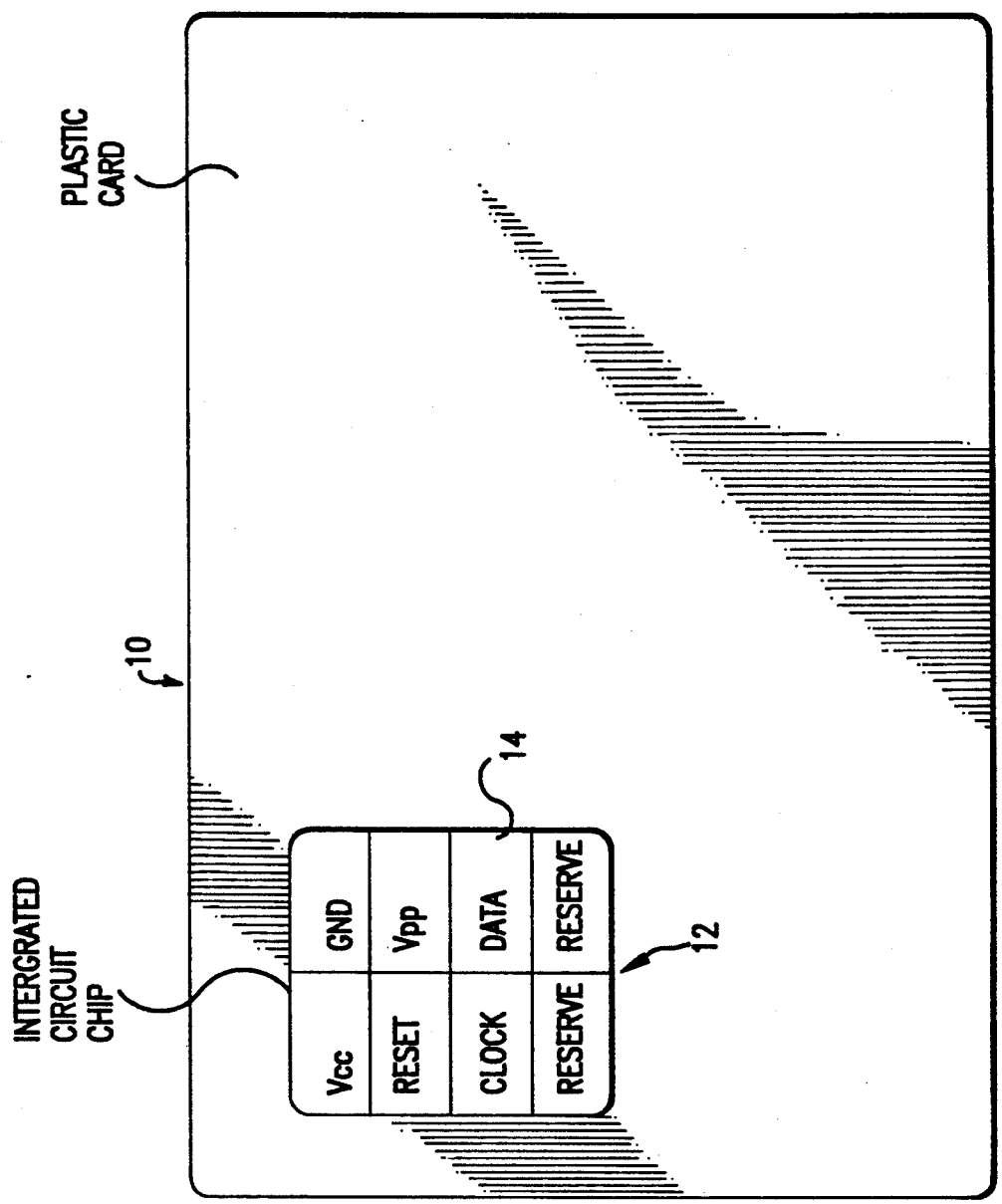
FIG. 2 is a plan view of the smart card of the system of FIG. 1.

Referring to FIG. 2, smart card 10 resembles, and has physical dimensions similar to, a plastic bank credit card. The physical dimension of smart card 10, according to the embodiment of the present invention, conforms with the ISO 7816/1,2,3 standard. Smart card 10 can be of two types or two card format, asynchronous and serial memory type or format, depending on the function of integrated circuit ("IC") chip 12 contained therein. IC chip 12 contained in the asynchronous card (for example, Schlumberger ® M16E and Microcard Technology MC74000) contains a built-in microprocessor and memory (e.g., RAM, EPROM or EEPROM). IC chip 12 contained in the serial memory card (for example, Schlumberger EE4K and Microcard Technology 16K EEPROM) provides memory only. The memory contained in both types of smart cards is a read/write type, whose contents can be readily accessed and updated.

IC chip 12 contained in smart card 10 has circuitry on one side and input/output (I/O) contact pads 14 on the opposite side. The circuit side of chip 12 is embedded into card 10 for protection from the external environment and the I/O contact pads side is exposed for conductive contacts with acceptor 20. I/O contact pads 14 of IC chip 12 provides contacts for ground GND, bias voltage Vcc, Read/Write data, clock and reset signals. The Read/Write data are serially read out of and written into IC chip 12. Vcc, GND, clock and reset signals are externally provided from acceptor 20 into IC chip 12, when smart card 10 is conductively engaged with acceptor 20. The clock and reset signals are provided for memory access control only for the serial memory type and because this type of card provides no internal clock signals.

FIG. 3 shows an example of the data structure of various types of smart cards (e.g., customer, services, set-up, and self-diagnostics types). The smart card, according to the embodiment of the present invention, has memory capacity of 500 bytes. Each card has a 2-byte code for identifying the card type. The customer card contains a primary access code and several secondary access codes, for example three secondary access codes as shown in FIG. 3. The secondary access codes correspond to the primary access codes of the three most previous guests. The service and self-diagnostic cards contain only the primary access code and contain no secondary access code. The set-up card contains several access codes which are installed in acceptor 20 during system set-up. Each access code installed in acceptor 20 corresponds to a different security level assigned to the card.

Figure 4:
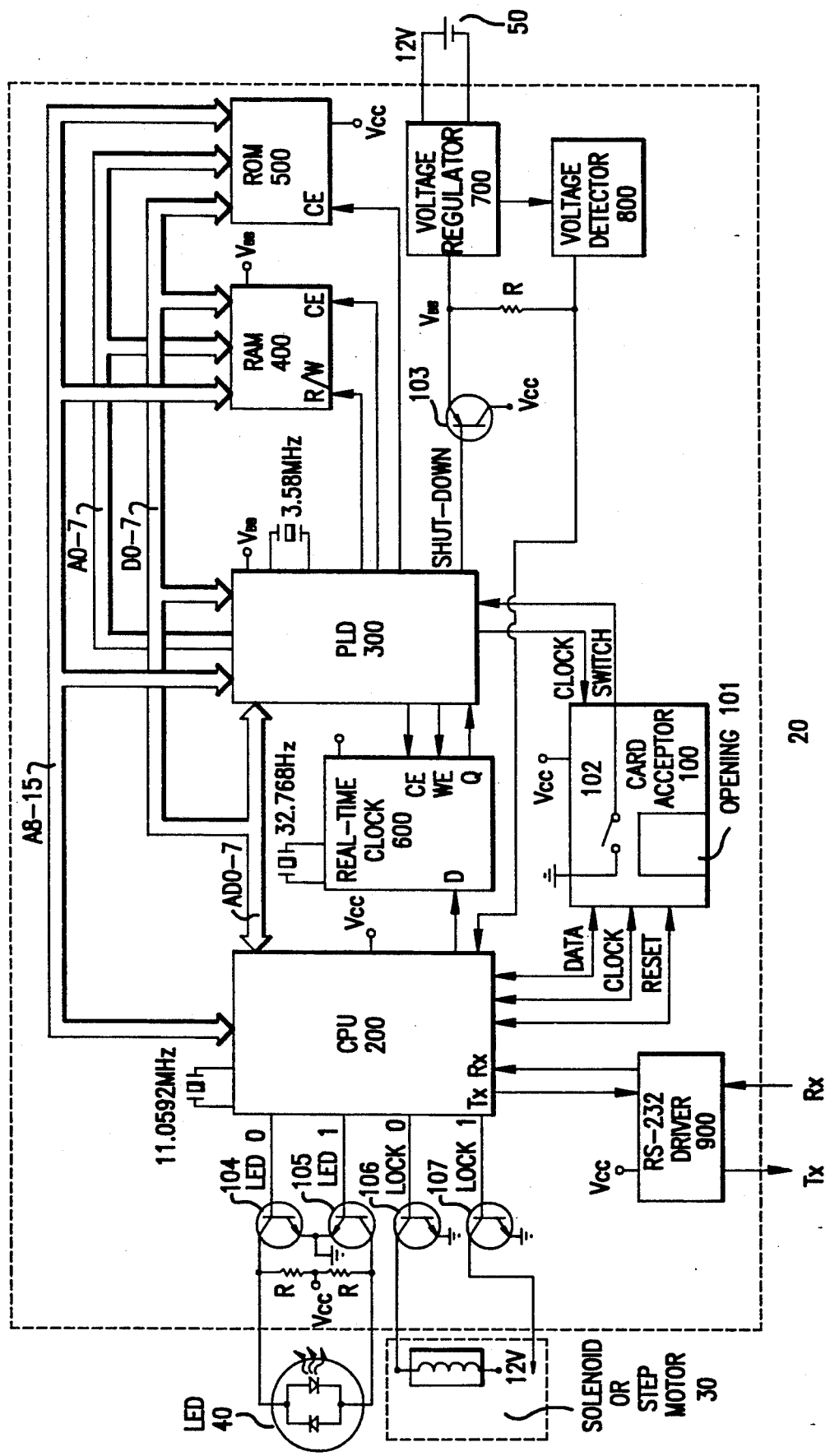
FIG. 4 is a schematic diagram of the access control system of FIG. 1.

FIG. 4 shows a schematic diagram of acceptor 20 according to the embodiment of the present invention. All of the elements of acceptor 20, enclosed by a dashed line in FIG. 3, are self-contained in a common circuit board assembly. The circuit board assembly has dimensions of, for example, 2.25 inches in width, 3.0 inches in length and 0.75 inches in thickness. However, further design modifications could lead to an even smaller package.

Acceptor 20 includes a card acceptor 100, CPU (Central Processing Unit) 200, PLD (Programming Logic Device) 300, RAM (Random Access Memory) 400, ROM (Read-Only Memory) 500, real-time clock 600, voltage regulator 700, voltage detector 800, and RS-232 driver 900.

Card acceptor 100 is an electro-mechanical device adapted to physically receive the smart card and conductively engage the I/O contact pads of the smart card with card acceptor 100. CPU 200 is a general purpose microcontroller for providing basic signal processing for card acceptor 100. An Intel 8051 microcontroller, for example, or equivalent, can be used. PLD 300 is a programmable logic device therein and provides all necessary decoding logic functions for acceptor 20. An Intel 5C090 PLD, for example, or equivalent, can be used. RAM 400 and ROM 500 each has 32K bytes of memory. RAm 400 can be any commercially available IC memory device. ROM 500 can be any commercially available EPROM. A bias voltage VBB, which is provided from the output of a voltage regulator 700 of battery 50, is continuously active and provides operational power to PLD 300 and RAM 400 for initial start-up. An 8-bit data bus is provided between CPU 200, PLD 300, RAM 400 and ROM 500 for addressing and data transfer.

Card acceptor 100 has an opening 101 through which the smart card is entered, a normally closable microswitch 102 which is spring loaded near the opposite end of opening 101, and contact mechanism which conductively engages the I/O contact pads of the smart card with card acceptor 100, when the card is fully entered into opening 101. Card acceptor switch 102 stays closed under spring tension when the smart card is not fully engaged in card acceptor 100.

When the card is fully entered into card acceptor 100, card acceptor switch 102, which is otherwise closed is forced to open and senses the physical impact of the engagement of the smart card. Switch 102 remains open under spring tension until the smart card is removed from card acceptor 100. Then, switch 102 causes to generate an "open" switch signal to PLD 300. PLD 300, in response the open switch signal, causes a shut-down signal to change the signal state from an original "high (or 1)" state to a "low (or 0)" state. The "low" shut-down signal activates (or turns on) transistor 103, which conductively couples $V_{BB}$, which is the 5 V output of voltage regulator 700, to a bias voltage $V_{cc}$. CPU 100 then sends a signal, via LED0, to activate transistor 104, which in response turns on LED 40 to flash red light beams to indicate the "power-on" condition of the access control system. This sets the system to the "power-on" condition.

Low-voltage detector 800, which is coupled to voltage regulator 700, detects the voltage level of battery 50. If the detected voltage level is low, for example, below 10.5 V, voltage detector 800 sends a signal to CPU 200. CPU 200 in response provides a sequence of ten pulses, via LED0, to transistor 104 and LED 40 to generate ten intermittent flashes of red light beams to indicate the "low-power" condition of battery.

When the system is set to the "power-on" condition, CPU 200 executes a sequence of preprogrammed initialization steps which are prestored in RAM 300 during system installation. Then, card acceptor 100 serially reads data from the smart card, via the I/O contact pads thereof. The read data is provided to CPU 200, via a data line, and the card format information contained in the data is first examined. If the format is not compatible with a specific application, CPU 200 causes PLD 300 to change the state of the shut-down signal from the "low" to "high" state. The "high" shut-down signal deactivates transistor 103, which in turn decouples $V_{cc}$ from battery 50. This causes LED 40 to turn off the flashing of red light beams. This sets the system to a "power off" condition.

If the card format is compatible, CPU 200 executes preprogrammed instructions stored in ROM 500 which examines the 2-byte card type code of the data read from the smart card and compares it with a corresponding code prestored in RAM 400 during system installation.

Then CPU 200 examines the access code of the data read from the smart card and compares it with the access code prestored in RAM 400 during set-up. If the access codes match, CPU 200 generates appropriate signals to transistors 104 and 105 to turn off the red LED 40 and to turn on the green LED 40 to flash green lights, for indicating the "accepted" condition. CPU 200 then, waits for a pre-programmed time duration, for example, six seconds, during which time the cardholder is to remove the smart card from card acceptor 100. If it is not removed, CPU 200 will not pass a signal, via LOCK0, to activate solenoid 30. If the card is removed within the programmed time duration, CPU 200 will pass the signal so that solenoid 30 is activated, during which time the opening mechanism is activated and the cardholder gains access to the access controlled area. If a step motor is used rather than a solenoid to control the opening mechanism, CPU 200 provides signals to both LOCK0 (to open) and LOCK1 (to latch).

The RS-232 driver provides interface between acceptor 20 and a portable or central computer which is optionally coupled thereto via a cable or some other medium. All entry records stored in RAM 400 and ROM 500 can be downloaded to the computer, and access codes and other programmable data can be uploaded to RAM 400. For example, if real time clock 600 is in error by more than 10 seconds, CPU 200 recognizes the anomaly and synchronizes real time clock 600 to that provided from the computer's internal clock.

FIGS. 5-9 shows an operational flow for various types of the smart card.

Figure 5:
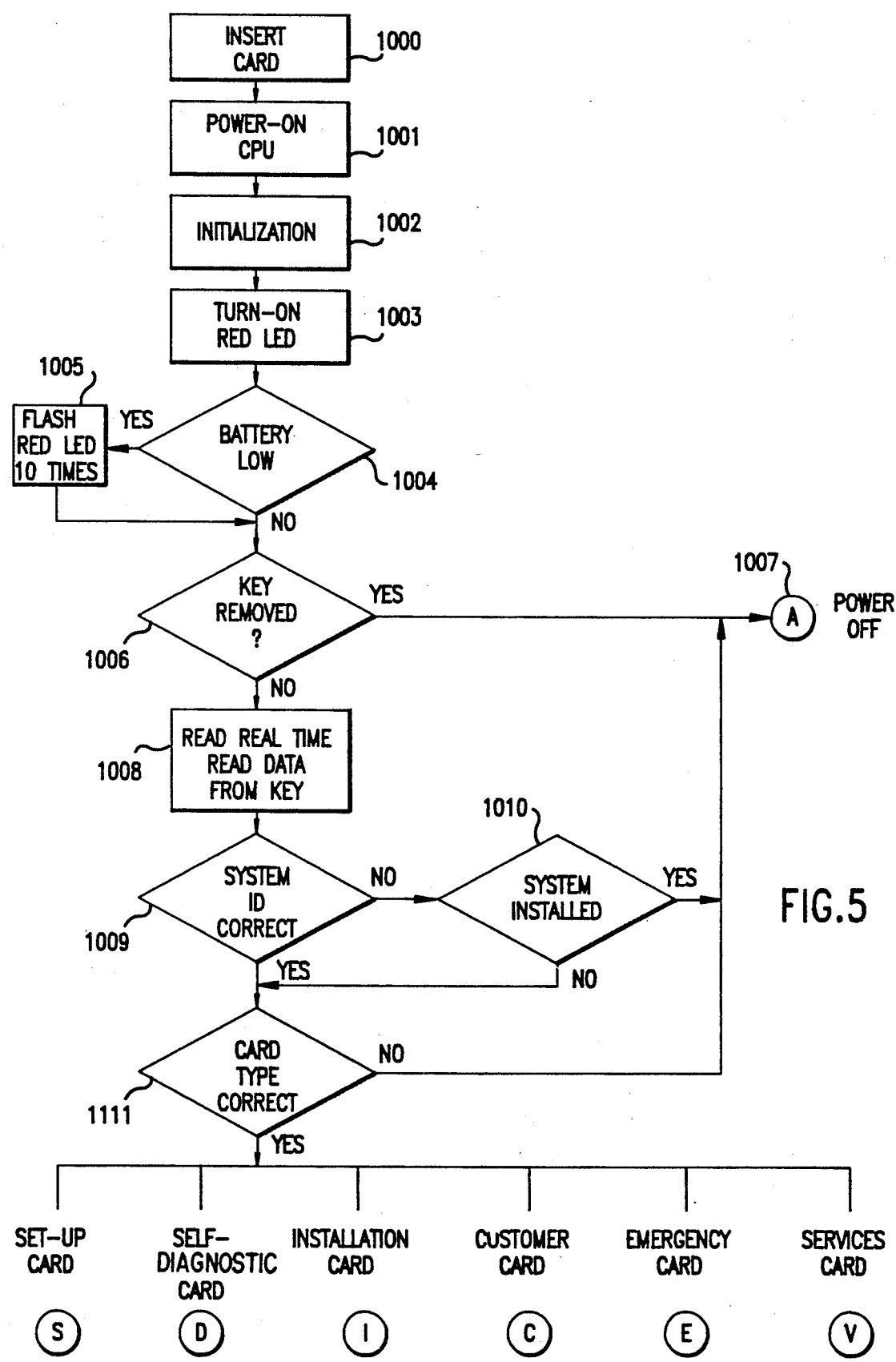
FIG. 5 is an operational flow of the system of FIG. 4.

FIG. 5 shows a common operational flow for all types of the smart card described below. When the smart card is fully entered into card acceptor 100 of acceptor 20, its physical impact causes card acceptor switch 102 to open which in turn provides an "open" switch signal to PLD 300 and causes CPU 200 to be conductivity connected to battery 50. (Step 1000). CPU 200 executes a sequence of pre-programmed initialization steps which has been prestored in ROM 500 during system installation. (Step 1001). The initialization includes, for example, setting the contents of RAM 400 to predetermined values, providing control signals to enable RS-232 driver 900, and running interrupt routines. (Step 1002). CPU 200 turns on the red LED 40 to flash red light beams to indicate the "power-on" condition. (Step 1003).

Upon receipt of the "open" switch signal from card acceptor 100, PLD 300 causes voltage detector 800 to detect the voltage level of battery 50. If the detected voltage is below a predetermined voltage (for example, 10.5 V), voltage detector 800 sends a signal to CPU 200 which in response activates transistors 104 and 105 to turn on the red LED 40 to flash red light beams ten times intermittently. (Step 1004). If the detected voltage is not below the predetermined voltage, card acceptor switch 102 senses whether the smart card has been removed from or is still fully engaged in card acceptor 100. (Step 1006).

If the smart card has been removed, card acceptor switch 102 will close and provide a "close" switch signal to PLD 300, which in turn deactivates shut-down transistor 103. The deactivated shut-down transistor 103 cuts power supply to $V_{cc}$ by decoupling $V_{cc}$ from battery 50. This causes LED 40 to turn off the flashing of light beams to indicate that the system is in the "power-off" condition. (Step 1007).

If the card is still fully engaged in card acceptor 100, card acceptor switch 102 remains open, and the "open" switch signal to PLD 300 is maintained. Real time clock 600 provides a real time to PLD 300 and card acceptor 100 starts reading data from smart card 10, via the read/write data contact pad of the memory chip thereof. The read data is serially transferred, via a data line, to CPU 200. (Step 1008).

CPU 200 checks the system ID of the data read from smart card 10 and compares it with a corresponding system ID prestored in RAM 400 in acceptor 20. (Step 1009). If the system IDs do not match, CPU 200 determines whether or not acceptor 20 has been previously set up by checking whether a predetermined sequence of installation data has been installed stored in RAM 400. For example, the installation data may be a 5-byte sequence of data (e.g., 5A, 25, 38, 25, 5A in sequence). (Step 1010). If CPU 200 does not find the installation data in RAM 400, it set the system to the "power-off" condition. (Ref. Step 1007). If CPU 200 finds the installation data, then it examines the card type ID code of the data read from smart card 10. (Step 1111).

Operational flows of the set-up card, customer card, self-diagnostic card, and service card are individually described in reference to FIGS. 6-9, respectively hereinafter.

Figure 6:
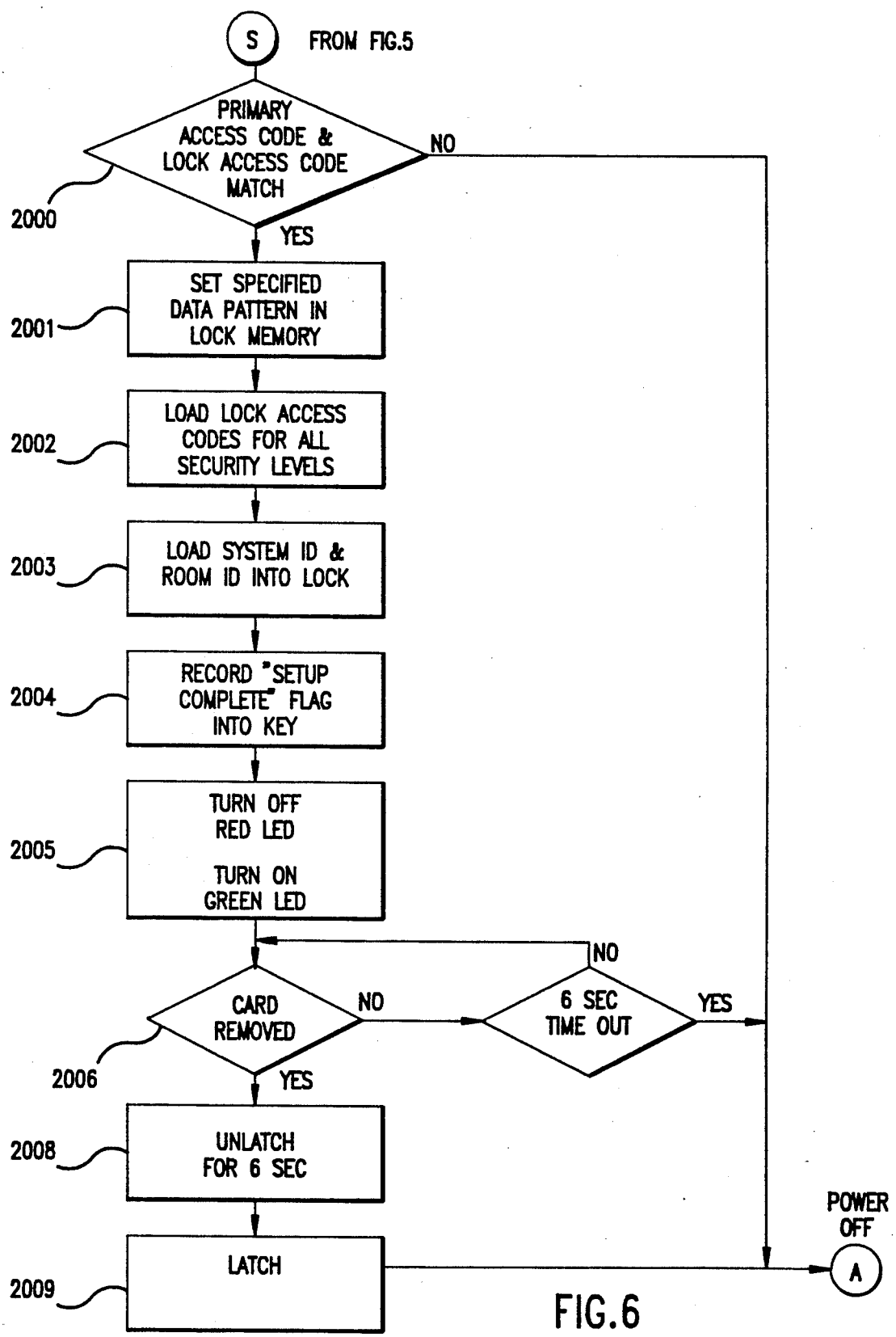
FIG. 6 is an operational flow for the set-up card of the system of FIG. 4.

FIG. 6 shows an operational flow for the set-up card. The set-up card is used in conjunction with system set-up. After CPU 200 identifies the card type, as described in reference to Step 1009, FIG. 5, it checks the access code of the smart card and compares it with the access code prestored in RAM 400 during system installation. If the access codes do not match, then CPU 200 set the system to the "power-off" condition. (Step 2000). If the access codes match, CPU 200 stores the predetermined set of installation data into RAM 400. (Step 2001).

Then, one or more access codes, each representing a different level of security, are down-loaded from the smart card into RAM 400. (Step 2002). The access control system ID and the ID representing a particular opening mechanism or access controlled area are down-loaded from the card into RAM 400. (Step 2003). Upon completion of the above, CPU 200 writes a "set-up complete" flag into the card. (Step 2004). CPU 200 causes LED 40 to turn-off the flashing of red light beams and turn-on the flashing of green light beams. (Step 2005).

Card acceptor 100 checks whether the smart card has been removed or is still fully engaged therein (ref. Step 1007, FIG. 5). (Step 2006). If the smart card has been removed, CPU 200 provides a signal, via LOCK0, to activate lock transistor 106, which in turn activates solenoid 30. If a step motor is employed rather than a solenoid, then signals are provided, via both LOCK0 and LOCK1, to both lock transistors 106 and 107. The signal provided on LOCK0 or LOCK1 is maintained for a predetermined time duration, for example, 6 seconds. (Step 2000). After the 6 seconds, the signal is removed from LOCK0 and LOCK1 and solenoid (or step motor) 30 are deactivated, (Step 2009), and the system is set to the "power-off" condition. (Step 2010). If CPU 200 determines that the card is still fully engaged in card acceptor 100, CPU 200 waits for the predetermined time duration (e.g. 6 seconds), and then sets the system to the "power-off" condition. (Step 2010).

Figure 7:
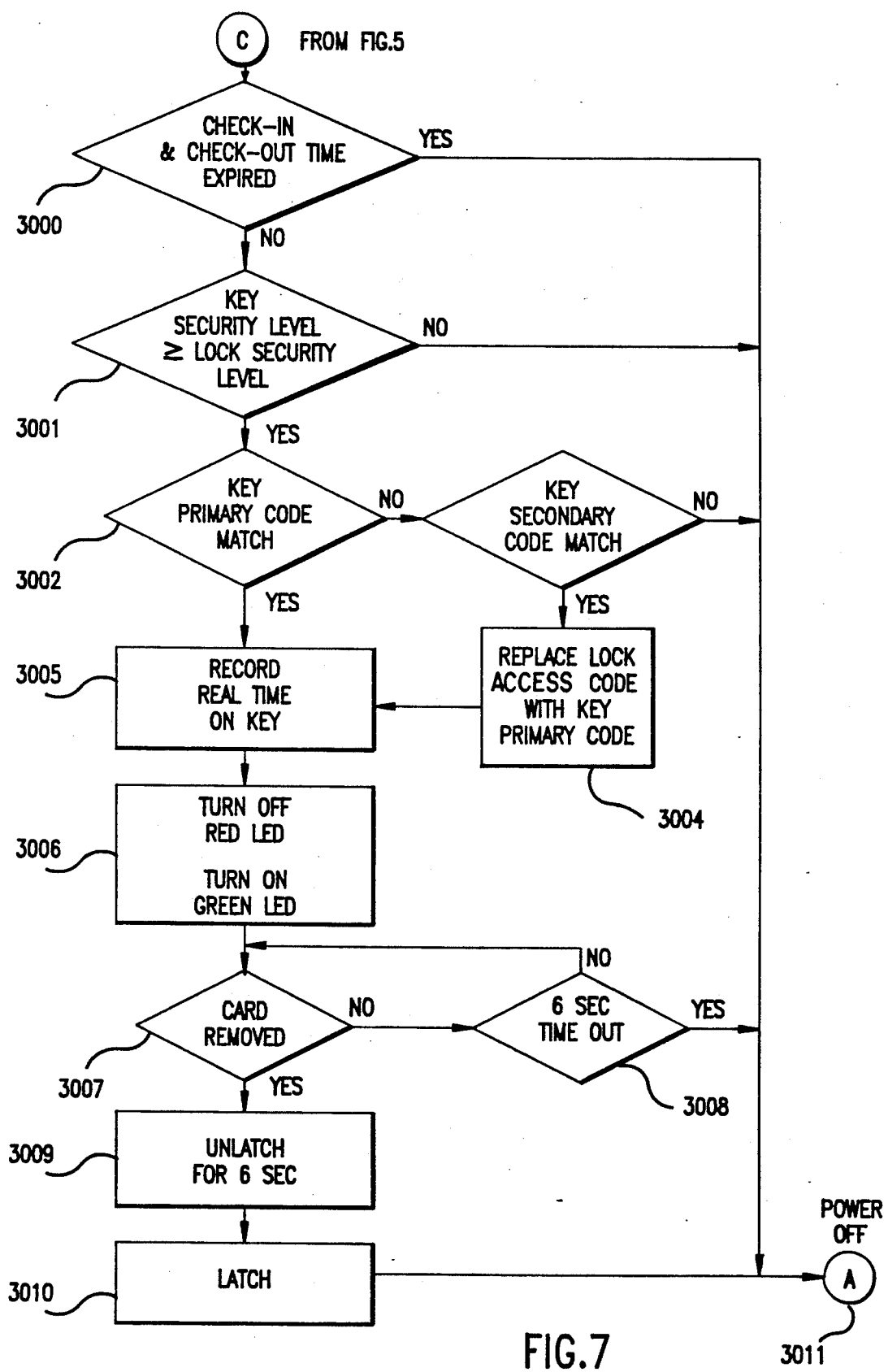
FIG. 7 is an operational flow for the customer card of the system of FIG. 4.

FIG. 7 shows an operational flow for the customer card. After the card type of smart card 10 is identified, as described in reference to step 1111 in FIG. 5, CPU 200 checks the codes representing the check-in and check-out times of the data read from the smart card and compare each time with a real time provided by real time clock 600. (Step 3000). The customer card can contain more than one check-in times and corresponding check-out times. Then, each time will be compared against the real time. If the provided real time is less than the check-in time and greater than the check-out time of a respective time duration, CPU 200 sets the system to the "power-off" condition. If not, CPU 200 examines the code representing the security level, which has been assigned to the card, of the read data and checks whether the security level code is greater than the security level code which has been prestored in RAM 400 during system installation. If it is not greater, CPU 200 sets the system to the "power-off" condition. CPU 200 selects one of the access codes stored in RAM 400 corresponding to the security level assigned to the card. (Step 3001).

CPU 200 checks the primary access code of the data read from the card and compares it with the selected access code prestored in RAM 400. (Step. 3002). If the access codes do not match, CPU 200 checks one of the secondary access codes of the read data from the card and compares it with the selected access codes. (Step 3003). If these access codes do not match, CPU 200 sets the system to the "power-off" condition. If these access codes match, CPU 200 replaces the selected access code with the secondary access code of the smart card in RAM 400. The customer card may contain more than one secondary access codes. Then, Step 3003 will be repeated until all of the secondary access codes are checked or the match is found. (Step 3004). Optionally, in steps 3003 and 3004, CPU 200 can execute a program to set the contents of the memory of the card to specified values to incapacitate the functioning of the card or to record codes representing the status of the card (e.g., stolen, invalid) thereon.

After the primary access code or the secondary access code finds match with the prestored code in RAM 400, CPU 200 reads a real time from real time clock 600 and writes the real time into the memory of the card. (Step 3005). Steps 3005-3010 are identical to Steps 2005-2010 in FIG. 6, as described above.

Figure 8:
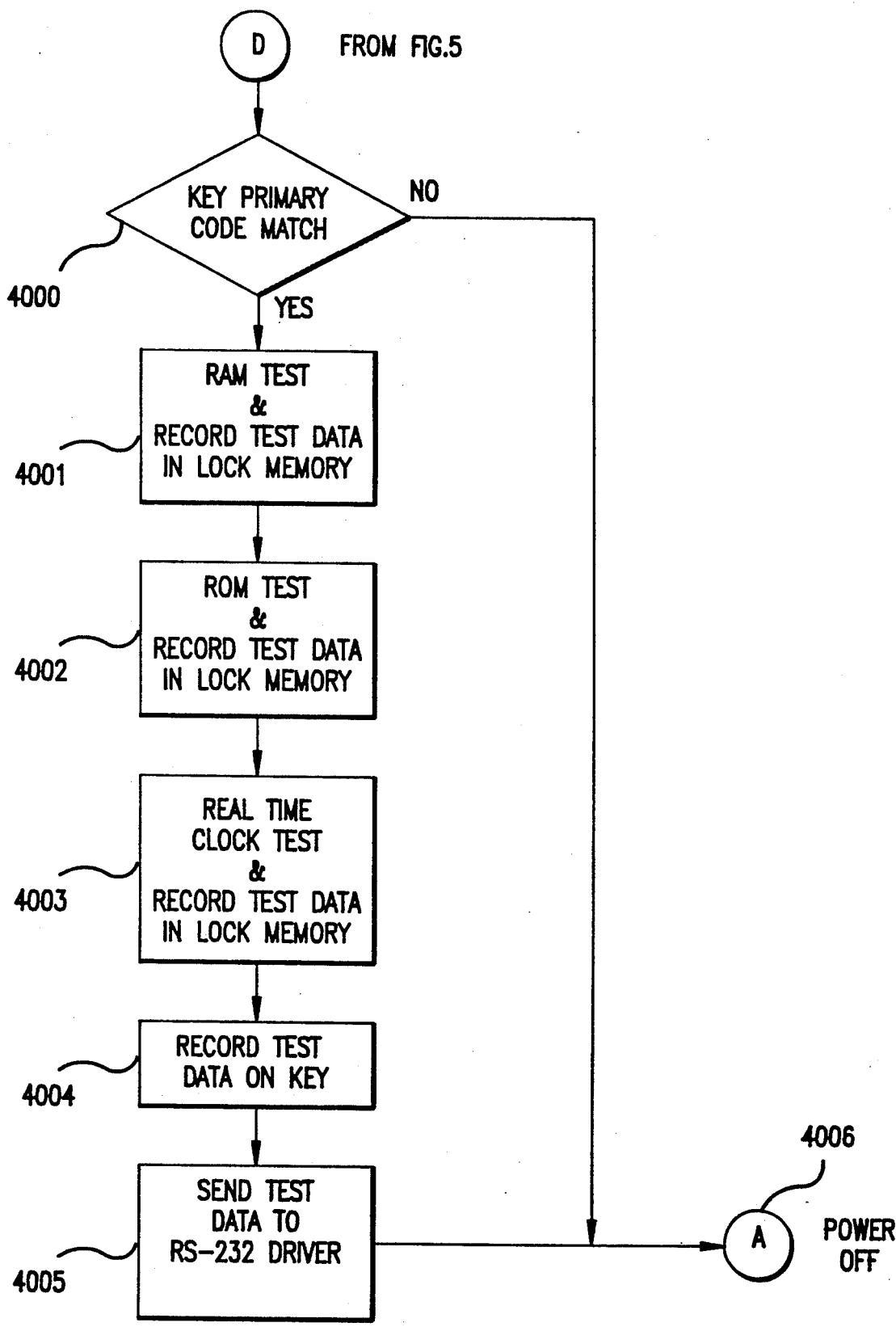
FIG. 8 is an operational flow for the self-diagnostic card of the system of FIG. 4.

FIG. 8 shows an operational flow for the self-diagnostic card. After the card type of smart card 10 is checked CPU 200 checks the primary access code of the card and compares it with the access code prestored in RAM 400 during system set-up. (Step 4000). CPU 200 then first checks the condition of RAM 400 by executing a set of test routines with test data prestored in ROM 500. RAM 400 is partitioned by 32 1-K byte partitions and each partition is checked at a time. Then the test result is stored in one of the partitions in RAM 400. (Step 4001). Similarly, ROM 500 is tested, and the result is stored in RAM 400. (Step 4002). Then, real time clock 600 is tested and the test result is stored in RAM 400. (Step 4003). The stored test result is then read out of RAM 400 and written into the memory of the smart card by card acceptor 100. (Step 4004). The stored test result can be also provided to RS-232 driver 900 to be accessible from the computer externally coupled thereto. (Step 4005). Then, CPU 200 sets the system to the "power-off" condition. (Step 4006).

Figure 9:
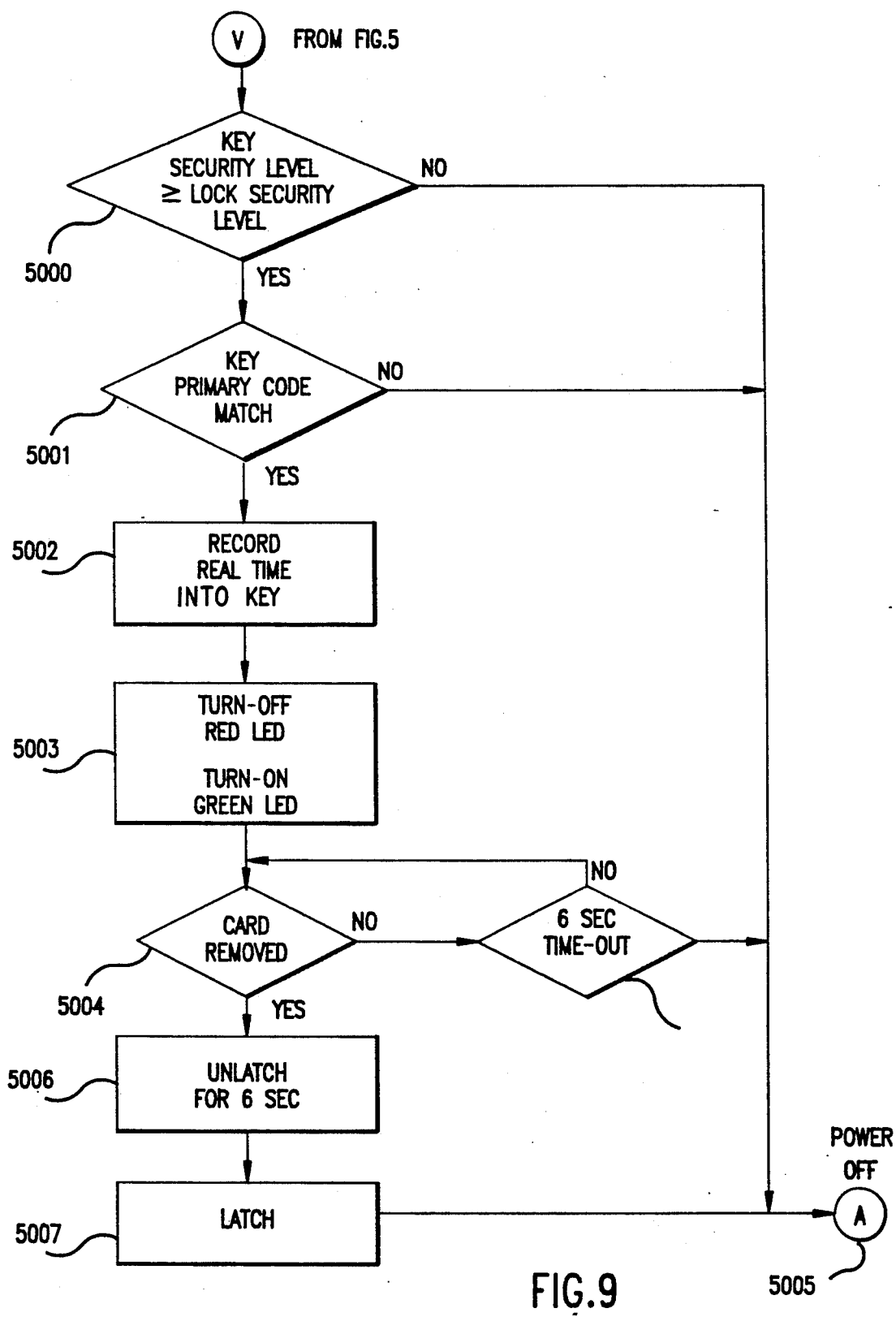
FIG. 9 is an operational flow for the service card of the system of FIG. 4.

FIG. 9 shows an operational flow for the service card. After the card type of smart card 10 is identified, CPU checks the code representing the security level of the card and compares it with a corresponding security level code prestored in RAM 400 during system set-up. (Step 5000). If the security level code of the card is not greater than the prestored security code, CPU 200 sets the system to the "power-off" condition. (Step 5007).

CPU 200 checks the primary access code of the card and compares it with one of the access codes prestored in RAM 400, which corresponds to the security level of the card. (Step 5001). If the access codes do not match, CPU 200 sets the system to the "power-off" condition. Otherwise, CPU read a real time from real time clock 600 and records it into the memory of the card. Steps 5003–5007 are identical to Steps 2005–2010 in FIG. 6, as described above.

It will be apparent to those skilled in the art that various modifications and variations can be made in the access control of the present invention and in construction of this system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An access control system, comprising:
   a power source;
   key means detachable from the rest of said access control system and including an integrated circuit embedded in said key means for storing key access information and transaction information at respective addresses thereof;
   means for activating the opening mechanism of an access controlled area; and
   acceptor means, coupled to the power source, for providing a control signal to activate said activating means including:
   means for electrically engaging said key means with said acceptor means,
   means, coupled to said engaging means, for coupling power from the acceptor to the key means to activate the integrated circuit of the key means during the time when the key means is electrically engaged with the acceptor means and for decoupling the power to deactivate the integrated circuit of the key means at other times, means for storing lock access information and transaction information, means, coupled to the lock access information storing means, for reading the lock access information, means, coupled to the engaging means, for reading the key access information from the integrated circuit of the key means during the time when the key means is electrically engaged with the acceptor means and the integrated circuit of the key means is activated, means, coupled to the lock access information reading means and the key access information reading means, for comparing the key access information with the lock access information, means, coupled to the comparing means, for providing the control signal to said activating means based on a comparison result, means for providing transaction information representing the condition of said acceptor means, and means, coupled to said transaction information providing means and the engaging means, for writing said transaction information into the integrated circuit of the key means at respective addresses during the time when the key means is electrically engaged with the acceptor means and the integrated circuit of the key means is activated, said transaction information writing means being operated following any comparison result indicating an access information match.

2. The access control system of claim 1, further comprising means coupled to the transaction information providing means for generating a real time and including the real time with the transaction information.

3. The access control system of claim 1, wherein the key access information includes a primary key access code and one or more secondary key access codes.

4. The access control system of claim 1, further comprising means for checking the condition of the lock access information storing means.

5. The access control system of claim 1, further comprising means for setting the contents of the lock access information storing means to predetermined initial values during system installation.

6. The access control system of claim 1, wherein said transaction information includes information representing the identity of an associated opening mechanism or access controlled area, further comprising means, coupled to the transaction information providing means, for storing said transaction information into the lock access information storing means.

7. The access control system of claim 1, further comprising computer means, coupled to said acceptor means and separated therefrom, including means for retrieving the lock access information and the transaction information from said lock access information storing means.

8. The access control system of claim 1, further comprising means for writing the transaction information into the lock access information storing means.

9. The access control system of claim 2, wherein the key access information includes information representing one or more time periods each period having beginning and corresponding end times, the user of the key means being permitted to gain access to the access controlled area only during each represented time period and not being permitted at other times.

10. The access control system of claim 3, wherein the lock access information includes one or more lock access codes, and wherein the comparing means compares a respective one of the lock access codes with the primary key access code and the control signal providing means provides the control signal whenever the respective lock access code is substantially identical to the primary key access code.

11. The access control system of claim 4, wherein the transaction information providing means provides information representing the condition of the lock access information storing means.

12. The access control system of claim 5, further comprising means for updating the contents of the lock access information storing means to one or more predetermined values different than said predetermined initial values.

13. The access control system of claim 5, wherein said setting means includes a computer, attachable to the acceptor means for coupling therewith and separated therefrom, for providing the predetermined initial values.

14. The access control system of claim 5, wherein said setting means includes data carrier card means detachable from the acceptor means for providing the predetermined initial values therefrom.

15. The access control system of claim 9, further comprising means for comparing the real time against the beginning and end times of a respective one of the one or more represented time periods, and means for conductively decoupling the acceptor means from the power source whenever the real time is less than the beginning time or greater than the corresponding end time.

16. The access control system of claim 10, wherein the key access information includes a predetermined security code and each of said one or more lock access codes corresponds to the predetermined security code.

17. The access control system of claim 12, wherein said updating means includes computer means, coupled to said acceptor means and detachable therefrom, for providing said one or more predetermine values.

18. The access control system of claim 12, wherein said updating means includes data carrier card means detachable from the acceptor means for providing said one or more predetermined values therefrom.

19. The access control system of claim 12, wherein the key access information includes information representing the identity of the user of the key means, further comprising means, coupled to the transaction information providing means, for storing said information representing the identity as transaction information into the lock access information storing means.

20. The access control system of claim 10, further comprising means for replacing one of the lock access codes with the primary key access code whenever said replaced lock access code is different than the primary key access code and identical to one of the secondary key access codes.

21. The access control system of claim 1, wherein said storing means of the key means includes a solid state memory device.

22. The access control system of claim 20, wherein said solid state memory device is a semiconductor memory chip.

23. The access control system of claim 1, wherein said acceptor means is self-contained in a common housing.

24. An access control system, comprising:
a power source;
key means detachable from the rest of said access control system and including an integrated circuit embedded in said key means for storing key access information and transaction information at respective addresses thereof;
means for activating the opening mechanism of an access controlled area; and
acceptor means, coupled to the power source, for providing a control signal to activate said activating means including:
means for electrically engaging said key means with said acceptor means,
means, coupled to said engaging means, for coupling power from the acceptor to the key means to activate the integrated circuit of the key means during the time when the key means is electrically engaged with the acceptor means and for decoupling the power to deactivate the integrated circuit of the key means at other times,
means for storing lock access information,
means, coupled to the lock access information storing means, for reading the lock access information,
means, coupled to the engaging means, for reading the key access information from the integrated circuit of the key means during the time when the key means is electrically engaged with the acceptor means and the integrated circuit of the key means is activated,
means, coupled to the lock information access reading means and the key access information reading means, for comparing the key access information with the lock access information,
means, coupled to the comparing means, for providing the control signal to said activating means based on a comparison result,
means, coupled to the comparing means and the engaging means, for writing into the integrated circuit of the key means at respective addresses specified values to incapacitate the key means based on the comparison result during the time when the key means is electrically engaged with the acceptor means and the integrated circuit of the key means is activated, said means for writing into the integrated circuit of the key means being operated following a comparison result indicating an access information mismatch.

25. The access control system of claim 24, wherein the key access information includes a primary code and the lock access information includes one or more lock access codes, and wherein said writing means writes the specified values into the integrated circuit of the key means whenever the primary code is not identical to one of said lock access codes.

26. The access control system of claim 25, wherein each one of said lock access codes corresponds to a security level assigned to said key means.

27. An integrated circuit card adapted to engage with an acceptor having power coupled to said acceptor, wherein said acceptor includes:
means for electrically engaging said integrated circuit card,
means for reading access information to generate a control signal for activating the opening mechanism of an access controlled area, and
means for writing transaction information representing the activation of the opening mechanism, said integrated circuit card being detachable from said acceptor and comprising an integrated circuit embedded integral in the card for storing the access information and the transaction information at respective addresses, said integrated circuit of the card receiving power from the acceptor to be activated during the time when the card is electrically engaged with the acceptor and being decoupled from the power to be deactivated at other times,
wherein the acceptor reads the access information from and writes the transaction information into the integrated circuit of the card during the time when the integrated circuit card is electrically engaged with the acceptor and the integrated circuit of the card is activated, said means for writing transaction information being operated no later than the activation of the opening mechanism.

28. The integrated circuit card of claim 27, wherein the access information includes a primary access code and one or more secondary access codes.

29. The integrated circuit card of claim 27, wherein the access information includes one or more time periods only during which the opening mechanism can be activated.

30. The integrated circuit card of claim 27, wherein the transaction information includes information representing a diagnostic condition of the acceptor.

31. The integrated circuit card of claim 27, wherein the transaction information includes the time of entry when the opening mechanism is activated.

32. An acceptor adapted for providing a control signal to activate the opening mechanism of an access controlled area, comprising:
means for activating the opening mechanism of an access controlled area;
means for electrically engaging key means having an integrated circuit embedded in said key means for storing key access information and transaction information in said integrated circuit at respective addresses;
means, coupled to said engaging means, for coupling power from the acceptor to the key means to activate the integrated circuit of the key means during the time when the key means is electrically engaged with the acceptor means and for decoupling the power to deactivate the integrated circuit of the key means at other times;
means for storing lock access information and transaction information;
means, coupled to the engaging means, for reading the key access information from the integrated circuit of the key means during the time when the key means is electrically engaged with the acceptor and the integrated circuit of the key means is activated,
means, coupled to the lock access information storing means, for reading the lock access information;
means, coupled to said key access information reading means and the lock access information reading means, for comparing the key access information with the lock access information;

means, coupled to the comparing means, for providing a control signal to activate the opening mechanism based on a comparison result;

means for providing transaction information representing the condition of said acceptor; and means, coupled to the engaging means and the transaction information providing means, for writing the transaction information into the integrated circuit of the key means at respective addresses during the time when the key means is electrically engaged with the acceptor and the integrated circuit of the key means is activated, said transaction information writing means being operated following any comparison result indicating an access information match.

33. The acceptor of claim 32, wherein the lock access information storing means stores the transaction information therein.

34. The acceptor of claim 32, further comprising means for generating a real time.

35. The acceptor of claim 22, wherein said transaction information providing means includes means for checking the condition of the storing means of the acceptor.

36. The acceptor of claim 32, further comprising means, coupled to the engaging means, for writing into the integrated circuit of the key means at respective address specific values to incapacitate the functioning of the key means whenever the key access information is not substantially identical to the lock access information.

37. A method of controlling the opening mechanism of an access controlled area, comprising the steps of:
storing lock access information in a lock having a memory and power coupled thereto;
storing key access information at respective addresses in an integrated circuit embedded in a key detachable from the lock prior to engaging the key with the lock;
electrically engaging the key with the lock;
coupling power from the lock to the key to activate the integrated circuit of the key during the time when the key is electrically engaged with the lock, and decoupling power to deactivate the integrated circuit of the key at other times;
reading the key access information from the integrated circuit of the key during the time when the key is electrically engaged with the lock and the integrated circuit of the key is activated;
reading the lock access information from the memory of the lock;
comparing the lock access information with the key access information;
activating the opening mechanism based on a comparison result; and
writing transaction information representing the activating step from the lock into the integrated circuit of the key at a respective address during the time when the key is electrically engaged with the lock and the integrated circuit of the key is activated, and indicating time of access in each case that the comparison result indicates an access information match.

38. The method of claim 37, further comprising step of storing said transaction information in the memory of the lock.

39. The method of claim 37, further comprising the step of generating a real time signal and including it with the provided transaction information.

40. The method of claim 37, wherein the key access information includes a primary key access code and one or more secondary key access codes, and the lock access information includes one or more lock access codes, and wherein said comparing step includes comparing a respective one of the lock access codes with said primary and secondary key access codes.

41. The method of claim 37, further comprising the step of checking the condition of the memory of the lock.

42. The method of claim 37, further comprising the step of storing said transaction information in the memory of the lock for retrieval at a later time.

43. The method of claim 39, wherein the key access information includes information representing one or more time periods each period having beginning and corresponding end times, and the comparing step inhibits the activating step during time periods other than said one or more time periods,
further comprising steps of comparing the real time against said beginning and end times of each of said one or more time periods; and activating the opening mechanism only when the real time falls within said time durations.

44. The method of claim 40, further comprising the step of replacing said respective lock access code with said primary key access code whenever said respective lock access code is substantially different than said primary key access code and substantially identical to one of said secondary key access codes.

45. The method of claim 41, further comprising the step of providing transaction information representing said checked condition of the memory of the lock.

46. A method of controlling the opening mechanism of an access controlled area, comprising the steps of:
storing lock access information in a lock having a memory;
storing key access information at respective addresses in an integrated circuit embedded in a key detachable from the lock prior to engaging the key with the lock;
electrically engaging the key with the lock;
coupling power from the lock to the key to activate the integrated circuit of the key during the time when the key is electrically engaged with the lock, and decoupling power to deactivate the integrated circuit of the key at other times;
reading the key access information from the integrated circuit of the key during the time when the key is electrically engaged with the lock and the integrated circuit of the key is activated;
reading the lock access information from the memory of the lock;
comparing the lock access information with the key access information;
activating the opening mechanism based on a comparison result; and
writing into the integrated circuit of the key at respective addresses specified values to incapacitate the key based on a comparison result indicating a lack of access information match during the time when the key is electrically engaged with the lock and the integrated circuit of the key is activated.

47. The method of claim 46, wherein the key access information includes a primary access code and one or more secondary access codes and the lock access information includes one or more lock access codes, and wherein the key is incapacitated whenever said primary access code is not substantially identical to one of said one or more lock access codes and is substantially identical to another of said one or more secondary access codes.

48. The method of claim 47, wherein each one of said one or more lock access codes corresponds to a security level assigned to the key.

49. The access control system of claim 1, wherein said key means has a plurality of contact pads therein and coupled to the integrated circuit thereof for providing electrical contacts.

50. The access control system of claim 49, wherein said plurality of contact pads are integral in the integrated circuit.

51. The access control system of claim 49, wherein said power coupling means includes means for providing power from the acceptor means to the key means through a respective one of the contact pads during the time when the respective contact pad is electrically engaged with the acceptor means.

52. The access control system of claim 49, wherein said key access information reading means includes means for reading the key access information from the key means through a respective one of the contact pads during the time when the respective contact pad is electrically engaged with the acceptor means.

53. The access control system of claim 49, wherein said transaction information writing means includes means for writing the transaction information into the key means through a respective one of the contact pads during the time when the respective contact pad is electrically engaged with the acceptor means.

54. The access control system of claim 24, wherein said key means has a plurality of contact pads therein and coupled to the integrated circuit thereof for providing electrical contacts.

55. The access control system of claim 54, wherein said plurality of contact pads are integral in the integrated circuit.

56. The access control system of claim 54, wherein said power coupling means includes means for providing power from the acceptor means to the key means through a respective one of the contact pads during the time when the respective contact pad is electrically engaged with the acceptor.

57. The access control system of claim 54, wherein said key access information reading means includes means for reading the key access information from the key means through a respective one of the contact pads during the time when the respective contact pad is electrically engaged with the acceptor.

58. The access control system of claim 54, wherein said transaction information writing means includes means for writing the transaction information into the key means through a respective one of the contact pads during the time when the respective contact pad is electrically engaged with the acceptor.

59. The access control system of claim 27, wherein said integrated circuit card has a plurality of contact pads therein and coupled to the integrated circuit thereof for providing electrical contacts.

60. The access control system of claim 59, wherein said plurality of contact pads are integral in the integrated circuit.

61. The access control system of claim 59, wherein power is coupled from the acceptor to the integrated circuit card through a respective one of the contact pads during the time when the respective contact pad is electrically engaged with the acceptor.

62. The access control system of claim 59, wherein said acceptor reads the access information from the integrated circuit card through a respective one of the contact pads during the time when the respective contact pad is electrically engaged with the acceptor.

63. The access control system of claim 59, wherein said acceptor writes the transaction information into the integrated circuit card through a respective one of the contact pads during the time when the respective contact pad is electrically engaged with the acceptor.

64. The access control system of claim 32, wherein said key means has a plurality of contact pads therein and coupled to the integrated circuit thereof for providing electrical contacts.

65. The access control system of claim 64, wherein said plurality of contact pads are integral in the integrated circuit.

66. The access control system of claim 64, wherein said power coupling means includes means for providing power from the acceptor means to the key means through a respective one of the contact pads during the time when the respective contact pad is electrically engaged with the acceptor.

67. The access control system of claim 64, wherein said key access information reading means includes means for reading the key access information from the key means through a respective one of the contact pads during the time when the respective contact pad is electrically engaged with the acceptor.

68. The access control system of claim 64, wherein said transaction information writing means includes means for writing the transaction information into the key means through a respective one of the contact pads during the time when the respective contact pad is electrically engaged with the acceptor.

69. The method of claim 37, wherein said key has a plurality of contact pads therein and coupled to the integrated circuit thereof for providing electrical contacts, and
    wherein said power coupling step includes providing power from the lock to the key through a respective one of the contact pads during the time when the respective contact pad is electrically engaged with the lock.

70. The method of claim 37, wherein said key has a plurality of contact pads integral therein and coupled to the integrated circuit thereof for providing electrical contacts, and
    wherein said key access information reading step reading the key access information from the key through a respective one of the contact pads during the time when the respective contact pad is electrically engaged with the lock.

71. The method of claim 37, wherein said key has a plurality of contact pads therein and coupled to the integrated circuit thereof for providing electrical contacts, and
    wherein said transaction information writing step includes writing the transaction information into the key through a respective one of the contact pads during the time when the respective contact pad is electrically engaged with the lock.

72. The method of claim 46, wherein said key has a plurality of contact pads therein and coupled to the integrated circuit thereof for providing electrical contacts, wherein said power coupling step includes providing power from the lock to the key through a respective one of the contact pads during the time when the respective contact pad is electrically engaged with the lock.

73. The method of claim 46, wherein said key has a plurality of contact pads therein and coupled to the integrated circuit thereof for providing electrical contacts, and wherein said key access information reading step includes reading the key access information from the key through a respective one of the contact pads during the time when the respective contact pad is electrically engaged with the lock.

74. The method of claim 46, wherein said key has a plurality of contact pads integral therein and coupled to the integrated circuit thereof for providing electrical contacts, and wherein said transaction information writing step includes writing the transaction information into the key through a respective one of the contact pads during the time when the respective contact pad is electrically engaged with the lock.

* * * * *

UNITED STATES PATENT AND TRADEMARK OFFICE
CERTIFICATE OF CORRECTION

PATENT NO. : 5,204,663
DATED : April 20, 1993
INVENTOR(S) : Philip S. Lee It is certified that error appears in the above-identified patent and that said Letters Patent is hereby corrected as shown below:

Title Page:
Abstract, line 10, "is" should read --are--.

Claim 17, column 14, line 45, "predetermine" should read --predetermined--.

Claim 35, column 17, line 24 after "the" (second occurrence), insert --lock access information--.

Claim 38, column 17, line 66, after "comprising", insert --the--.

Abstract, line 5, "information, information" should read --information--. (Title Page)

Signed and Sealed this

First Day of February, 1994

Attest:

BRUCE LEHMAN

*Attesting Officer*     *Commissioner of Patents and Trademarks*